United States Patent [19]

Yasuda et al.

[11] 3,810,093

[45] May 7, 1974

[54] CHARACTER RECOGNIZING SYSTEM EMPLOYING CATEGORY COMPARISON AND PRODUCT VALUE SUMMATION

[75] Inventors: Michio Yasuda, Koganei; Hiroshi Makihara; Shozo Kadota, both of Kokubunji, all of Japan

[73] Assignee: Hitachi, Ltd., Marunouchi, Chiyoda-ken, Tokyo, Japan

[22] Filed: Nov. 9, 1971

[21] Appl. No.: 196,992

[30] Foreign Application Priority Data

Nov. 9, 1970 Japan ............................. 45-97915

[52] U.S. Cl. ..................................... 340/146.3 MA

[51] Int. Cl. ............................................ G06k 9/12

[58] Field of Search .......... 340/146.3 MA, 146.3 Q, 340/146.3 R, 146.3 S, 146.3 H, 146.3 T

[56] References Cited

UNITED STATES PATENTS

| | | | |
|---|---|---|---|
| 3,384,875 | 5/1968 | Bene et al. | 340/146.3 Q |
| 3,152,318 | 10/1964 | Swift, Jr. | 340/146.3 MA |
| 3,588,823 | 6/1971 | Chow et al. | 340/146.3 S |
| 3,525,982 | 8/1970 | Cooreman et al. | 340/146.3 R |
| 3,239,811 | 3/1966 | Bonner | 340/146.3 T |
| 3,339,179 | 8/1967 | Shelton, Jr. et al. | 340/146.3 H |

*Primary Examiner*—Paul J. Henon
*Assistant Examiner*—Leo H. Boudreau
*Attorney, Agent, or Firm*—Craig & Antonelli

[57] ABSTRACT

A character recognizing or recognition system characterized in that, in order to determine the category of an unknown character, a plurality of reference characters are used to compute the correlation between the mutually adjacent reference characters and also the correlation between the unknown character and the reference character; and the category of the unknown character is determined by pair judgement according to the weighting coefficient determined by said correlation data, whereby the unknown character is recognized. This system makes it possible to average the weight distribution and to minimize the read error.

1 Claim, 14 Drawing Figures

INVENTORS
MICHIO YASUDA, HIROSHI MAKIHARA,
SHOZO KADOTA
BY Craig, Antonelli & Hill
ATTORNEYS INVENTORS
MICHIO YASUDA, HIROSHI MAKIHARA,
SHOZO KADOTA
BY Craig, Antonelli & Hill
ATTORNEYS INVENTORS
MICHIO YASUDA, HIROSHI MAKIHARA
SHOZO KADOTA
BY Craig, Antonelli & Hill
ATTORNEYS

INVENTORS

MICHIO YASUDA, HIROSHI MAKIHARA

SHOZO KADOTA

BY Craig, Antonelli & Hill

ATTORNEYS

INVENTORS
MICHIO YASUDA, HIROSHI MAKIHARA,
SHOZO KADOTA
BY Craig, Antonelli & Hill
ATTORNEYS INVENTORS
MICHIO YASUDA, HIROSHI MAKIHARA,
SHOZO KADOTA
BY Craig, Antonelli & Hill
ATTORNEYS INVENTORS
MICHIO YASUDA, HIROSHI MAKIHARA
SHOZO KADOTA
BY
Craig, Antonelli & Hill
ATTORNEYS

INVENTORS

MICHIO YASUDA, HIROSHI MAKIHARA,

SHOZO KADOTA

BY Craig, Antonelli & Hill
ATTORNEYS

CHARACTER RECOGNIZING SYSTEM EMPLOYING CATEGORY COMPARISON AND PRODUCT VALUE SUMMATION

BACKGROUND OF THE INVENTION

This invention relates to character recognizing systems and more particularly to character recognizing systems suited for optical character readers capable of reading printed characters in limited print types.

DESCRIPTION OF THE PRIOR ART

The conventional character recognizing system, called a matrix matching system, is classified according to analog and digital types.

An analog matrix matching system is operated on a simple principle. This system, though easily designable, has many drawbacks. For example, there are difficulties in modifying the type of character to be read and increasing the number of kinds of character categories. Furthermore, similar characters belonging to the individual categories can hardly be discriminated since the system is designed to be able to read only average characters throughout categories. To solve this problem, in the prior art the portions where characters differ from each other are heavily weighted. In this method, however, characters receive weight locally, and it is possible to make the system inoperable with respect to characters which can normally be recognized without the aid of weighting.

Also, according to a digital matrix matching system, there are difficulties in designing the circuit for extracting the characteristics of an unknown character. This system cannot be used for practical operation unless the system design is largely modified dependent upon the designer's intuition.

SUMMARY OF THE INVENTION

In view of the foregoing, an object of this invention is to provide a novel character recognizing system developed from matrix matching systems.

Another object of this invention is to provide a character recognizing system employing a pair judgement method and thus minimizing unreadable ratios and misreading.

Another object of the invention is to provide a character recognizing system employing a tournament method in addition to the pair judgement method and thus simplifying the system composition without lowering the reading accuracy.

For best realizing the above objects, the invention uses the following methods for sorting unknown characters into an $l$ number of categories.

1. A method in which weighting functions W$mn$ ( $i$, $j$) are provided for every arbitrary pair ( the $m^{th}$ and $n^{th}$ categories ) among an $l$-number of categories, and the category to which the unknown character belongs is determined according to the combination of judgements using the weighting function of each pair ( such a judgement will hereinafter be referred to as a pair judgement ).

2. A method based on the above method ( 1). More specifically, according to the method ( 1) , the necessary number of the kind of weighting function is $l\,(l-1)/2$. If these functions are incorporated directly into the system, the size of the system must simply be expanded. To avoid this, the fact that the pair judgement weighting function can be represented by a linear combination of a pair of reference characters with which the unknown characters are compared is utilized, and an $l$-number of reference characters P$k$ ($i$, $j$) corresponding to an $l$-number of categories are provided in the system by suitable means. For sorting characters, the correlation S$kx$ between the unknown character P$x$ ($i$, $j$) and said $l$-number of reference characters P$k$ ($i$, $j$), (where $k$ is 1, 2, . . . .) is obtained, as expressed by the following equation.

$$Skx = \sum_{i,j} Px(i,j) \cdot Pk(i,j) \qquad (1)$$

Then a certain specific computation and comparison computation are made on the characters by the use of a predetermined coefficient or a coefficient obtained by computation on the correlation between one reference character and another, whereby a result equivalent to what is available by the judgement based on the weighting function is obtained.

3. A method in which character recognition is done in two steps. In the first step, an $l$-number of reference characters is used, thereby determining the categories of most of the unknown characters. In the second step, the rest of the unknown characters whose categories could not be judged at a sufficient reliability due to noise or deformed print are sorted by the use of deformation reference characters provided for the individual categories.

The other objects, features and advantages of the invention will be apparent from the following detailed description taken in conjunction with the accompanying drawings.

DESCRIPTION OF THE PREFERRED EMBODIMENTS

Figure 1:
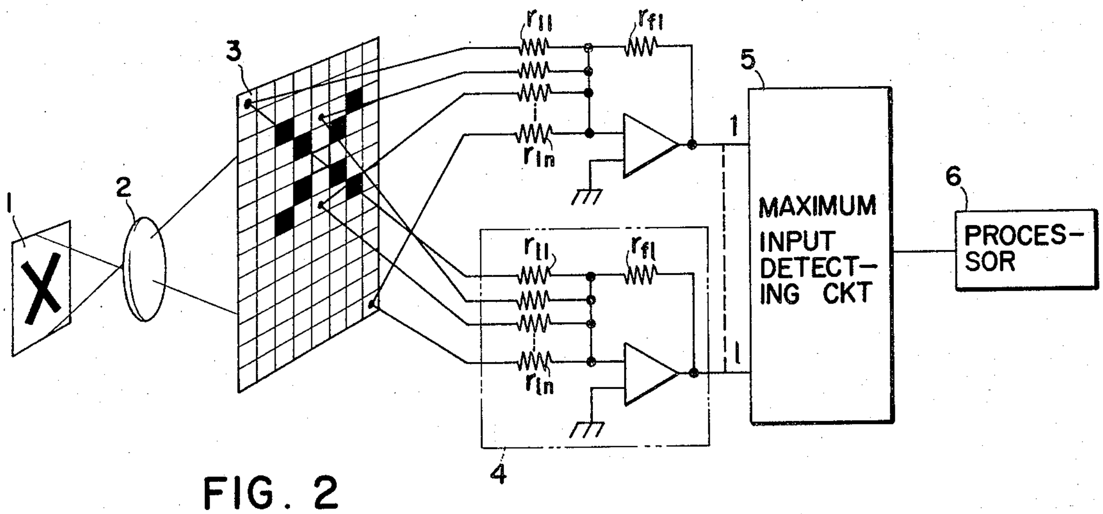
FIG. 1 PRIOR ART
FIG. 1 is a schematic diagram showing an example of conventional character reader.

Referring to FIGS. 1 through 4, there is illustrated a conventional analog matrix matching system and weighting coefficients relevant to the system. In FIG. 1, the numeral reference 1 denotes a document indicating an unknown character. The light reflected from the document is converted into an analog or digital electric signal by a photoelectric converter (not shown diagramatically) comprising, for example, photocells and a cathode-ray flying spot scanner or a photomultiplier, which are arranged two-dimensionally in parallel. The converted signal is applied to amplifiers 3 disposed two-dimensionally. The electrical image of the unknown character to be read is obtained as an output of the two-dimensionally disposed amplifiers 3 (or two-dimensionally disposed registers 3). The value of the output voltage of the amplifier 3 represents the tone of the character. A predetermined $n$-number (equal to or smaller than the number of two-dimensionally disposed amplifiers) of resistors $r_{11} \sim r_{1n} \ldots . r_{l1} \sim r_{ln}$ are provided for an $l$-number of character categories and are connected to the amplifier output terminals, and the other ends of these resistors are connected in parallel to the input terminal of respective amplifiers in adder 4 having feedback resistors $r_{f1} \sim r_{fl}$ for each category, thereby forming an $l$-number of adders corresponding to the individual categories. The outputs of these adders are compared with each other by a maximum input detecting circuit 5, in which the adder producing the maximum output is detected. Based on the detected result, a processor 6 judges that the unknown character belongs to a category corresponding to said adder.

Figure 2:
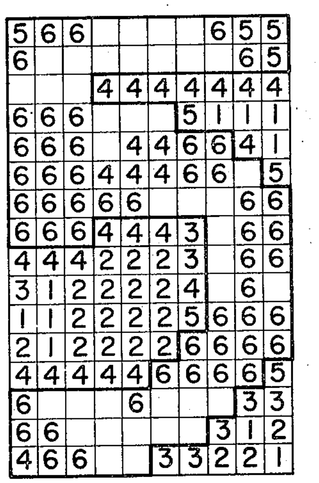
FIG. 2 PRIOR ART
FIGS. 2 through 4 are graphic representations showing weighting coefficients used for the character reader as in FIG. 1.

A suitable weight is added to the resistance of each of the resistors $r_{11} \sim r_{1n} \ldots . r_{l1} \sim r_{ln}$ which constitute an adder of each category, so that an electrical output corresponding to the reference character belonging to each category can be effectively obtained. FIG. 2 shows part of the weighting coefficient corresponding to the character 5; and FIGS. 3 A and 3B correspond to the weighting coefficients corresponding to the characters A and B.

Figure 4:
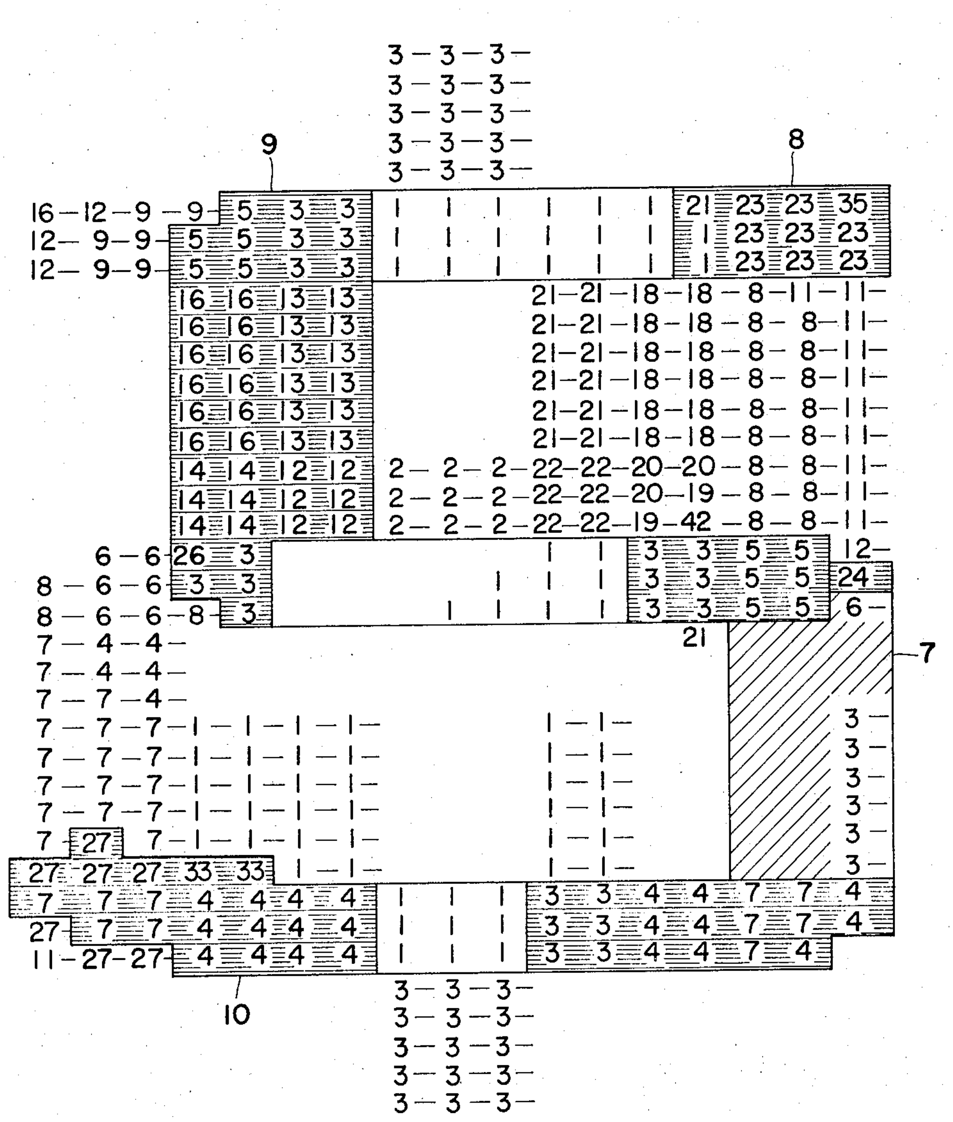
FIG. 4 PRIOR ART

FIG. 4 shows another example of weighting coefficient corresponding to the character 5. The weight $(i, j)$ is determined so as to satisfy the equation:

$$\sum_{i,j} W(i, j) \cdot P(i, j) = 1000 \qquad (2)$$

on condition that the unknown character is perfectly coincident with the reference character 5; or $$\sum_{i,j} W(i, j) \cdot P(i, j) = 0 \qquad (2')$$

on condition that the unknown character is perfectly coincident with another reference character. P $(i,j)$ denotes the output per bit of the amplifier 3 which figures out an unknown character.

Figure 3A:
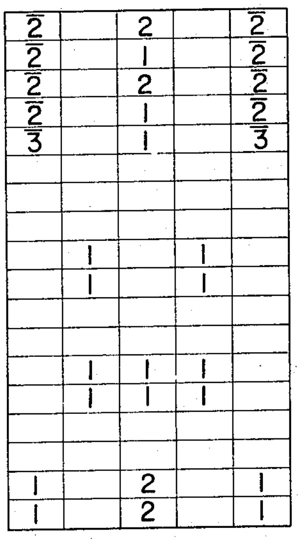
FIG. 3A PRIOR ART
Figure 3B:
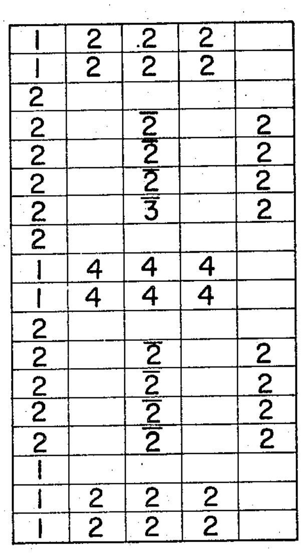
FIG. 3B PRIOR ART

When, for example, a weighting coefficient is determined as in FIG. 3, the weight A which is determined so as to provide the maximum output against the character A provides an output larger than O for other reference characters. The weight B for reading the character B provides a large output for other characters such as E. In other words, if the unknown character is not exactly coincident with the reference character and a noise is introduced thereinto, this can become a cause of misreading.

Referring to FIG. 4, there is shown weight distribution. A positive weight is added to the vertical stroke portion 7 for distinctly discriminating the character 5 from 2 and thus reading 5 accurately. As shown in FIG. 4, positive weights are concentrated in the areas 8, 9 and 10 with lateral lines. If these areas are judged to be black, then the character is judged to be 5. A large weight located in the upper part of the area 10 is produced because this area in the character 5 is somewhat raised in comparison with other characters. In actual printing, this area tends to be omitted. Hence, the weight in this area does not serve as an effective weight for character discriminating operation. According to the invention, the foregoing three methods are combined to realize highly accurate character reading. More specifically, the weighting function for executing a pair judgement is obtained for an arbitrary pair of categories ( the $m^{th}$ and $n^{th}$ ). The weighting function Wmn $(i, j)$ for sorting unknown characters into either the $m^{th}$ or $n^{th}$ category is expressed as:

$$\omega mn\ (i, j) = Snn/\Delta\ Smn\ Pm\ (i, j) - Smn/\Delta\ Smn\ Pn\ (i, j) \qquad (3)$$

$$\omega nm\ (i, j) = Smm/\Delta\ Snm\ Pn\ (i, j) - Snm/\Delta\ Snm\ Pm\ (i, j) \qquad (3')$$

where $$Smn = \sum_{ij} Pm(i, j)Pn(i, j)$$

$$Smm = \sum_{ij} P^2m(i, j)$$

$$Snn = \sum_{i,j} P^2n(i, j)S'$$

$$\Delta\ Smn = Smm \times Snn - Smn \times Snm$$

$$\Delta\ Snm = \Delta\ Smn$$

Using $\omega mn\ (i, j)$ and $\omega nm\ (i, j)$ of Equations (2) and (3), $$Wmn\ (i, j) = Snn + Snm/\Delta\ Smn\ Pm\ (i, j) - Smm + Smn/\Delta\ Snm\ Pn\ (i, j) \qquad 4$$

$\omega mn\ (i, j)$ and $\omega nm\ (i, j)$ are characterized by Equation (5) below.

$$(\omega mn, Pm) = \sum_{i,j} \omega mn(i, j)Pm(i, j) = 1$$

$$(\omega mn, Pn) = 0$$
$$(\omega nm, Pm) = 0$$
$$(\omega nm, Pn) = 1 \qquad (5)$$
$$W_{mn}\ (i, j) = w_{mn}\ (i, j) - w_{nm}\ (i, j)$$

Therefore, Wmn $(i, j)$ has the following characteristics as indicated by Equation (6) below.

$$(Wmn, Pm) = 1$$
$$(Wmn, Pn) = -1 \qquad (6)$$

When Equation (7) is satisfied with respect to a product value summation between the weighting function Wmn and an unknown character Px $(i, j)$, this unknown character Px $(i,j)$ is judged to belong to the $m^{th}$ category. Namely, $$(Wmn, Px) > T\ (n \neq m, n = 1, 2, \ldots . . b\ ) \qquad (7)$$

where T > O and the threshold T is determined experimentally, taking reading accuracy into consideration. Using Equation (4), Equation (7) is rewritten as $$(W_{mn}, P_x) = \omega^1{}_{mn}\,(P_m, P_x) - \omega^2{}_{mn}\cdot(P_n, P_x) = \omega^1{}_{mn}\cdot S_{mx} - \omega^2{}_{mn}\cdot S_{nx} \tag{8}$$

where $\omega^1mn = (Snn + Snm)\,/\Delta\, Smn$
$\omega^2mn = (Smm + Smn)\,/\Delta\, Smn$ $$Smx = \sum_{i,j} Pm(i,j)\cdot Px(i,j)$$

$$Snx = \sum_{i,j} Pn(i,j)\cdot Px(i,j)$$

In this case, the weighting function, as described above, is defined by the above $w^1{}_{mn}$ and $w^2{}_{mn}$.

Figure 5:
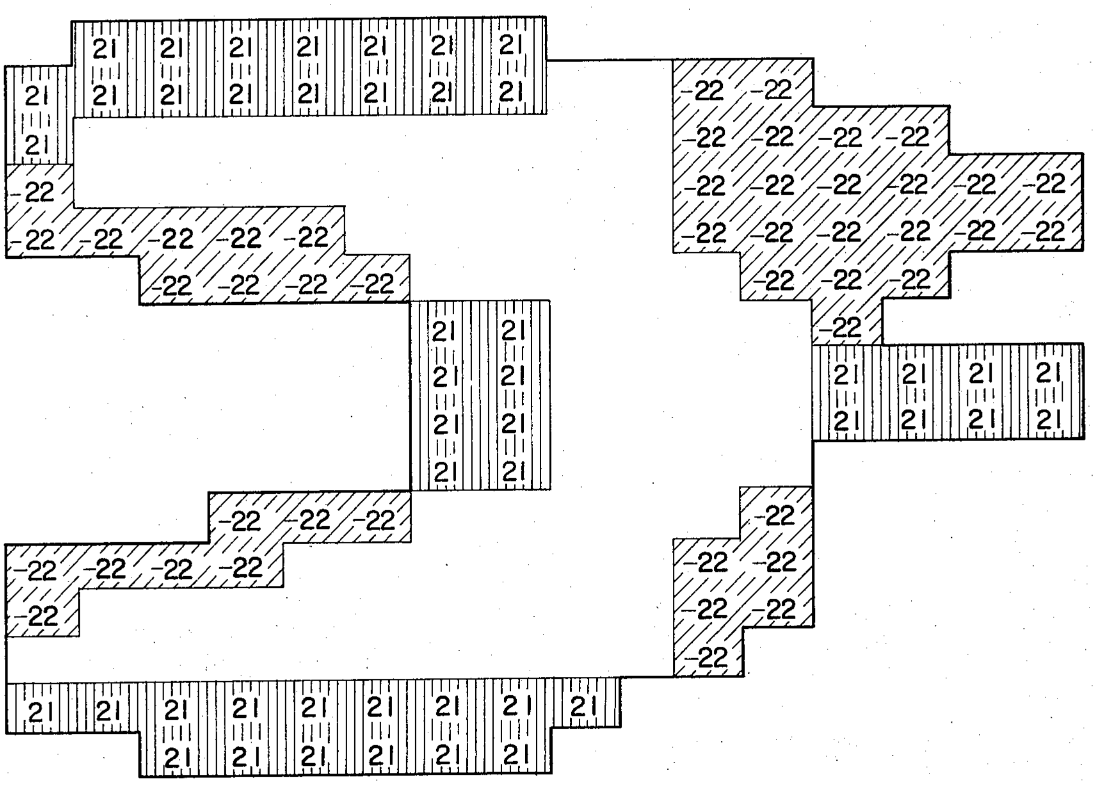
FIG. 5 is a diagram showing weighting coefficients used according to this invention.

FIG. 5 shows an example of pair judgement weighting functions obtained by the above methods. This weighting function is used to discriminate between the abstract symbol ⑂ and numeral 4 specified in JIS OCR-A print type. $\omega^1$mn and $\omega^2$mn of Equation (8) are multiplied by 1000 so that the weighting function is 1000 for the reference character ⑂ and −1000 for the reference character 4. In comparison with FIG. 4, FIG. 5 shows uniform distribution of weights over the different portions between the pair of characters ⑂ and 4 which are to be discriminated from each other. If the unknown character belongs to one of a specific pair of categories, it is apparent that the weighting function in FIG. 5 has higher reliability than that in FIG. 4. The weighting function in FIG. 5 is determined according to Equation (8) so that the point corresponding to the reference character becomes black ($Pk\,(i,j) = 1$) when a character printed by a line printer is quantized at the pitch of 0.18 mm ($h$) × 0.12 mm ($w$), and the resultant binary character is averaged for each category to obtain black for each point on the character at more than a certain definite rate.

The above examples show the effect of the pair judgement weighting functions obtained by the use of Equations (2) through (8). The same effect can be obtained by the use of $W'^1mn$ and $W'^2mn$ derived from Equations (9) through (15) corresponding to Equations (2) through (8) based on the reference characters $Pm\,(i,j)$, $Pn\,(i,j)$ and reference figure $Po\,(i,j)$ which represent the individual categories. (Note: $Po\,(i,j) = 1$, with respect to all $i$ and $j$)

$$W'mn\,(i,j) = \Delta\, mm/\Delta\, Smn\; Pm\,(i,j) + \Delta\, mn/\Delta Smn\; Pn\,(i,j) + \Delta\, mo/Smn\; Po\,(i,j)$$

$$W'mm\,(i,j) = \Delta\, nm/\Delta\, Snm\; Pm\,(i,j) + \Delta nn/\Delta Snm\; Pn\,(i,j) + \Delta\, no/\Delta\, Snm\; Po\,(i,j)$$

$$\text{where } \bar{S}'mn = \det\begin{pmatrix} Smm & Smn & Smo \\ Snm & Snn & Sno \\ Som & Son & Soo \end{pmatrix} = \det(S)$$

Figure 6:
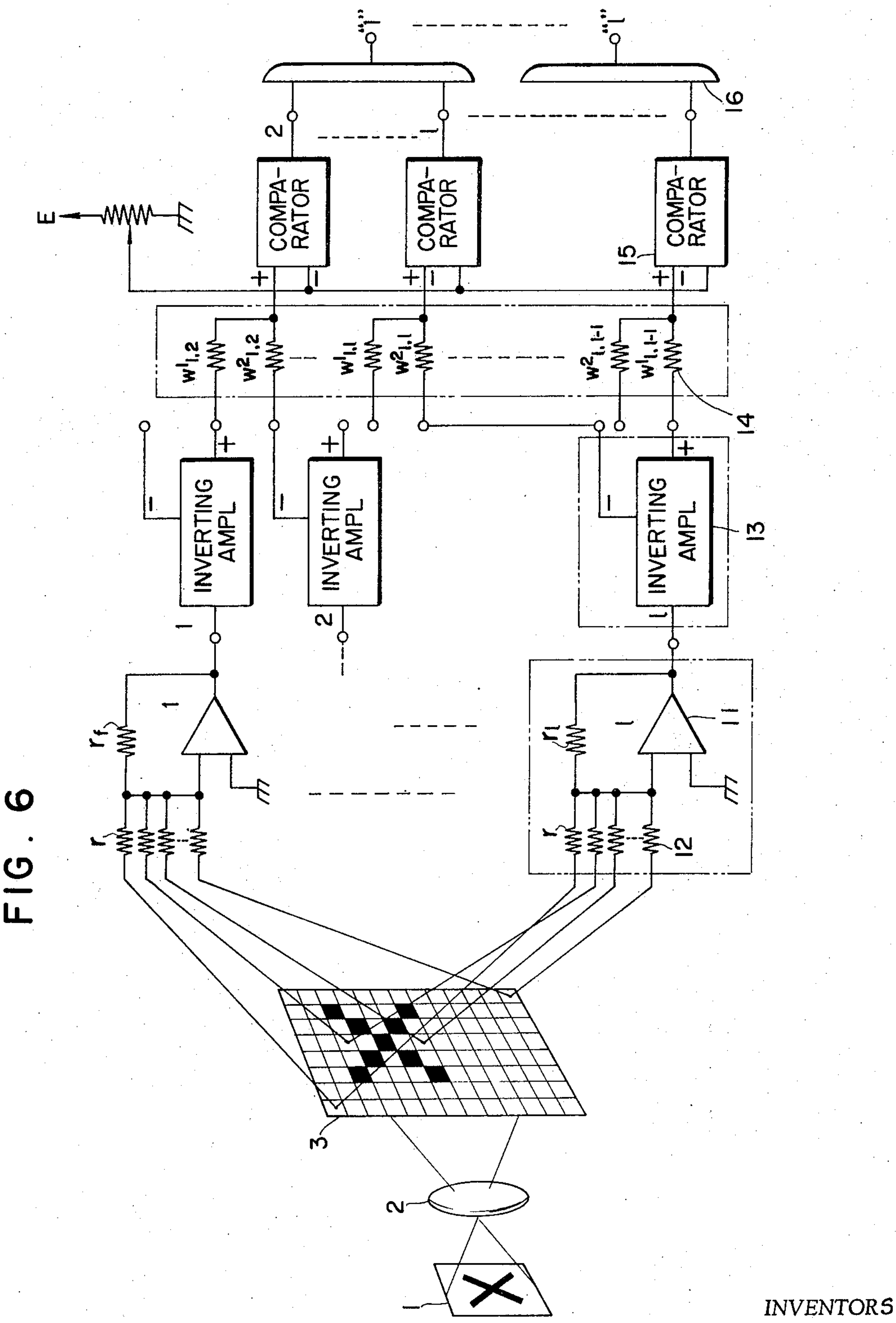
FIG. 6 is a schematic diagram showing a system embodying this invention.

$\Delta\, l\, k$ represents a co-determinant having its axis on the element $Slk$ of matrix (S), on condition that $l$ and $k$ correspond to $m$, $n$ or O.

$$W'mn\,(i,j)\;\Delta\, mm - \Delta\, nm/\Delta\, Smn\; Pm\,(i,j) + \Delta mn + nm/\Delta\, Smn\; Pn\,(i,j) + \Delta\, mo - \Delta\, no/\Delta\, Smn\; Po\,(i,j) \tag{11}$$

$$\left.\begin{aligned} (\omega'mn, Pm) &= \sum_{i,j} \omega'mn(i,j)\cdot Pm(i,j) = 1 \\ (\omega'mn, Pn) &= 0 \\ (\omega'nm, Pm) &= 0 \\ (\omega'nm, Pn) &= 1 \end{aligned}\right\} \tag{12}$$

$$\left.\begin{aligned} (W'mn, Pm) &= 1 \\ (W'nm, Pn) &= -1 \end{aligned}\right\} \tag{13}$$

$$(W'mn, Px) \geqq T'\;(n \neq m,\, n = 1, 2, \ldots) \tag{14}$$

$$(W'_{mn}, P_x) = w'^1{}_{mn}\,(P_m, P_x) + w'^2{}_{mn}\,(P_n, P_x) + w'^3{}_{mn}\,(P_o, P_x) \ldots (15)$$

where $w'^1mn = (\Delta\, mn - \Delta\, nm)/\,\Delta\, S'mn$
$w'^2mn = (\Delta\, mn - \Delta\, nn)/\,\Delta\, S'mn$
$w'^3mn = (\Delta\, mo - \Delta\, no)/\,\Delta\, S'mn$ FIG. 6 shows a character reader of an analog matrix matching system to which the pair judgement method of this invention is applied. In FIG. 6, the outputs of two-dimensionally disposed amplifiers 3 represent the image of an unknown character, as in the conventional character reader. These outputs are applied to input resistors 12 of amplifiers 11 having feedback resistors $r_f$. In the conventional system as in FIG. 1, the resistance value $r_{ij}$ is determined so as to express the weight of the $i^{th}$ point of the $i^{th}$ category and, hence, the values $r_{ij}$ differ generally from each other. Whereas, the purpose of said resistance 12 is to establish the correlations $Smx$ and $Snx$ between the unknown character and reference character. This resistance 12 is not weighted and, therefore, its value is constant $r$. The output of the amplifier 11 is applied to the + terminal of the comparator 15 by way of an inverting amplifier 13 and a weighting coefficient resistor 14. The value of the resistor 14 is determined so as to express $\omega^1$mn and $\omega^2$mn in Equation (8). A voltage corresponding to said threshold T is applied to one terminal of said comparator 15. As a result, the computed result from Equations (10) and (11) is obtained as an output of said comparator. This output is supplied to an "and" circuit 16 in which an output is produced in the circuit corresponding to the category to which the unknown character belongs.

According to this system, $l\,(l-1)$ numbers of additional correlation weighting functions can be realized by $l$ numbers of constant weighting resistors 12, and thus the reading accuracy can be markedly increased. On the other hand, however, the system requires $l\,(1-1)$ numbers of pair judgements for $l$ numbers of categories if unknown characters are assorted by pair judgement strictly according to the principle as described above. In this method, therefore, many numbers of comparators and additional correlation weighting function resistors must be used. This is not very advantageous from practical point of view.

Each decision on character recognition is more reliable by pair judgement weighting function than by the conventional weighting function. Then it is advantageous to utilize this feature for determining unknown character sorting at a possibly higher accuracy, without executing all $l \times (l-1)$ kinds of pair judgements. This method is a kind of tournament method, in which portions of insufficient coincidence between the reference character and the unknown character are omitted one by one by the individual pair judgements.

Figure 7:
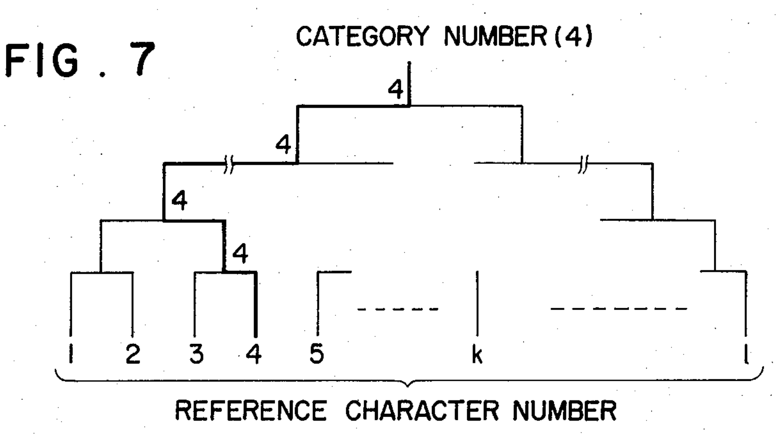
FIGS. 7 and 8 are diagrams showing a tournament method applied to the system of this invention.

FIG. 7 shows a chart of a tournament category decision method. According to this method, by each pair judgement, one of two categories remains as a candidate for final decision, and the other category is omitted. In other words, one category is left as a result of $(l-1)$ numbers of pair judgements. When this last one is considered to be the final decision category in principle, then the number of pair judgements necessary for determining the category of the unknown character is $(l-1)$, which is $1/l$ of $l(l-1)$ required for category decision obtained by execution of all the pair judgements.

Practically, the number of reference characters used for sorting a plurality of characters into categories is $l$. This number is not always equal to the category number $m$. (Generally, $l$ may be larger than or equal to $m$.) The aim of unknown character sorting is not to judge which reference character the unknown character is most closely related to, but to judge which category the unknown character belongs to. The following tournament sorting method is for sorting the unknown character into a specific category or judgement unable category at a threshold T, under the condition that the number of reference characters is $l$, and the number of categories is $m$ ($l \geqslant m$).

Figure 8:
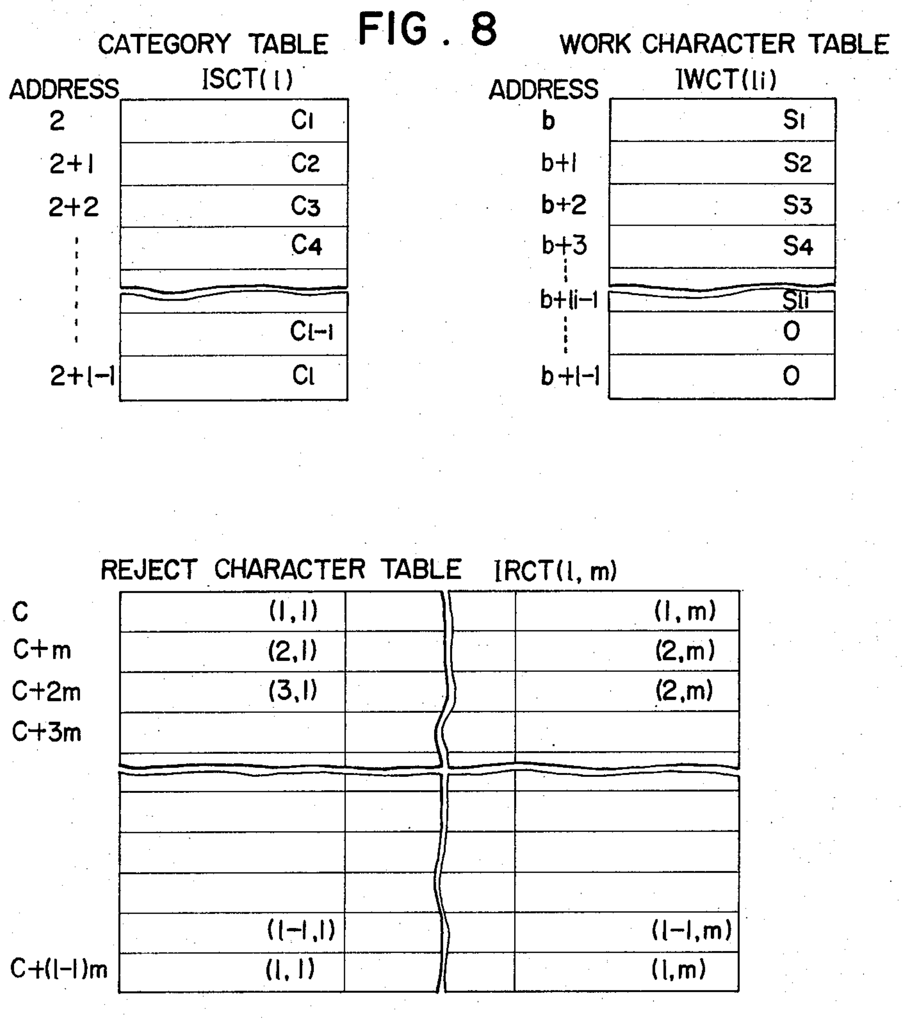

Referring to FIG. 8, there are shown tables used for a tournament sorting method. The category table ISCT shows the reference character numbers and category numbers in comparison. The reject character table IRCT is such that the pair judgement regarding an arbitrary reference character pair (the $k^{th}$ and $n^{th}$ reference characters) is referred to in the $j^{th}$ tournament and, if the relationship as in Equation (7) is not established, namely in case Equation (16) is satisfied, the analogous reference character number is registered thereinto according to Equation (17).

$$(Wkn,\ Px) < T \tag{16}$$

$$(Wkn,\ Px) \geqslant o \Rightarrow IRCT\ (k, j) = n$$
$$(Wkn,\ Px) < o \Rightarrow IRCT\ (n, j) = k \tag{17}$$

Zeros are registered into other places of IRCT. In the work character table IWCT, the number of reference characters to be compared in each tournament is loaded in succession from the top position, and the reference character number left as a result of each pair judgement is loaded in succession from the top position by substituting the old character number.

After $m$-number of tournaments, there remains only one reference character number in the work character table. Then, by referring to the category to which this reference character belongs in the category table, the category to which the unknown character belongs is temporarily determined. This temporary category satisfies not Equation (7) but (17). Further referring to the reject character table IRCT, the finally left reference character number is found. When it is assumed that the finally left reference character number is $k$, and that Equation (8) is satisfied for all $j$ ($1 \leqslant j \leqslant m$), then the category of the unknown character is determined finally to be $K = ISCT\ (k)$.

$$IRCT\ (k, j) = Rj\ ISCT\ (Rj) = ISCT\ (k) \tag{18}$$

If Equation (18) is not satisfied the unknown character is judged to be unable to sort. According to this method, if a plurality of reference characters belong to the same category, this means that the requirement of Equation (7) is not needed for the pair judgement among these reference characters.

Figure 9A:
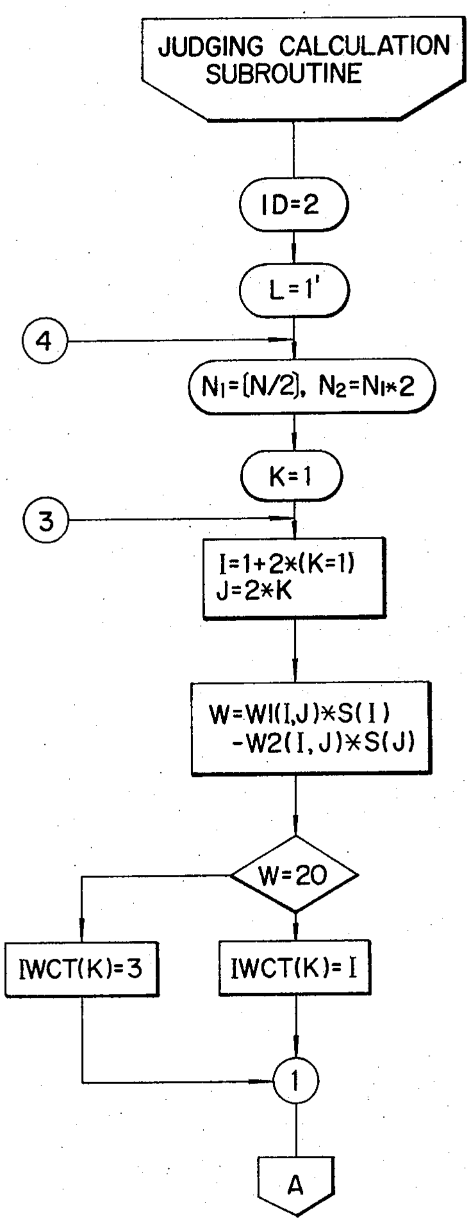
FIGS. 9A, 9B and 10 are flowcharts programmed according to the method as in FIGS. 7 and 8, and FIGS. 11 and 12 are schematic diagrams showing another embodiment of this invention.
Figure 9B:
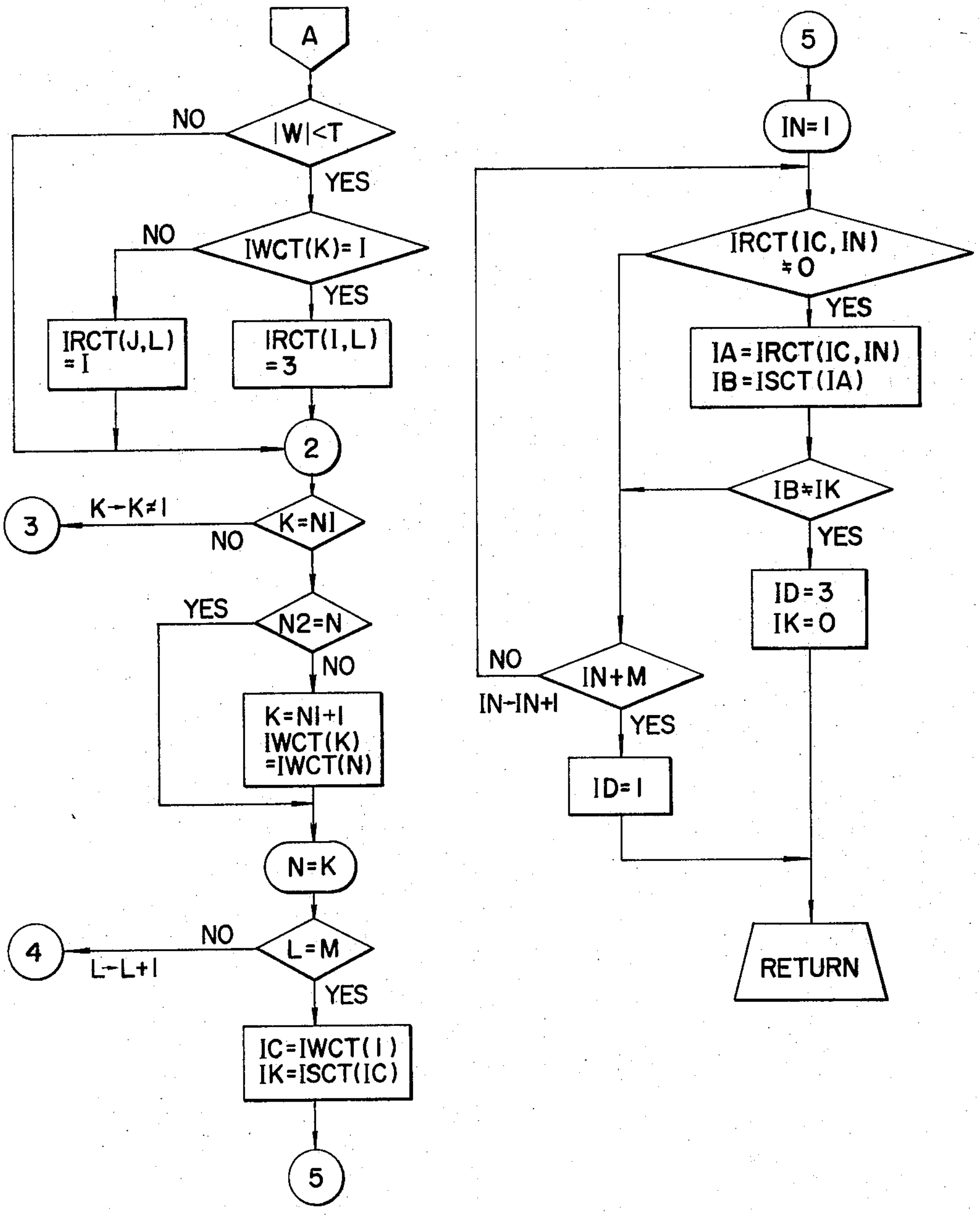

FIGS. 9 A and 9 B are flowcharts of subroutine types showing how a plurality of reference characters are allowed to belong to the same category according to the tournament sorting method.

Experiment 1

Two thousand five hundred characters in 50 kinds (50 characters/kind) including OCR-A type numerals, English letters and symbols were quantized at 0.1mm (both height and width), and then sorted by the use of reference characters (one reference character per kind) provided from a computer based on JIS Standards. All the characters were correctly sorted. The printed characters used in this experiment are of ISO-A font of IBM Model 72 typewriter. Sorting was done based on a 10 percent value of thershold as in Equation (7).

Experiment 2

JIS OCR-A type 24,000 characters in 20 kinds including numerals and letters and part of symbols (4 ʃ ɲ — CNSTXZ) were printed by a line printer and quantized at a sampling pitch of 0.18 mm ($h$) × 0.12mm ($w$). Then 400 characters of each kind of type were sampled and averaged to form reference characters. Using these reference characters, the unknown characters were sorted. As a result, 1.4 percent of characters were unreadable, and three out of 24,000 characters were mis-sorted. In this experiment, threshold T of Equation (7) used is at the value of 10 percent.

The unreadable rate and misreading rate allowable for the character reader is less than $1 \times 10^{-3}$ to $1 \times 10^{-4}$. The result of experiment 2 is insufficient. Why the result is below the requirement is because print deformation is larger in the line printer than in the typewriter. In connection with this result, another experiment was conducted on a maximum of four characters of each kind of type were picked up from among the characters which had been unreadable, and the total of 21 characters were added as modified reference characters to the existing reference characters. Then the same sample of characters were sorted. It was found that the unreadable rate or misreading rate could be reduced as to specific kinds of characters, but in some cases, an erroneous ratio of a reading or unreadable rate was increased as to other kinds of characters. It was impossible to sufficiently reduce the unreadable rate or erroneous reading ratio as a whole. The same result was obtained even when the deformation reference character was determined in different ways or the number of modified reference characters was changed within the range of 21 characters.

When about 1.4 percent of characters which could not be judged by the use of regular reference characters were sorted by the use of said 21 deformation reference characters, it became possible to sort these unreadable characters perfectly. This shows that a higher readable ratio can be obtained by the method in which the unknown characters are roughly sorted by one reference character per category and then are sorted by the second stage judgement by the use of a suitable number of modified reference characters than by the method in which the unknown characters are sorted finally by one stage of tournament judgement using pair judgement.

The above experiments relate to JIS OCR-A type. It is apparent that the experiment results are useful irrespective to the print type employed, as long as the unknown characters are of a group of unit print style. For simultaneous reading of characters of multi-font it may be advantageous that a plurality of reference characters are prepared for the same category in the first stage judgement. In the case of simultaneous reading of a plurality of multi-font characters, which font is to be used for the reference character and which font for the irregular character are determined according to the difference (or similarity) between characters observed in concrete and also according to experimental data. As described above, the aim of the first stage judgement is to make rough sorting. Therefore, other known methods, such as methods for character sorting based on maximum similarity, may be used.

In some cases the readability ratio regarding special kinds of characters defined by Equation (12) can be improved by the use of correlation S'mn instead of Smn. (S'mn is a generalized form of Smn.)

$$S'mn=\sum_{i,j} P'm(i,j)Pn(i,j)$$

$$S'mx=\sum_{i,j} P'm(i,j)Px(i,j)$$

$$S'mm=\sum_{i,j} P'm(i,j)Pm(i,j)$$

where P*m* (*i,j*) represents a character in the thick form of P*m* (*i,j*). The thick one will hereinafter be referred to as the first type reference character, and P*m* (*i,j*) as the second type reference character. The first type reference character may be formed from the average character, and the second type reference character may be formed by thinning the first type reference character. Or the first type reference character may be made coincident with the second type reference character. In practice, determination of the first and second reference characters depends on experimental data; however, it is sufficient for most types of characters that the first and second reference characters are determined according to average characters.

Figure 10:
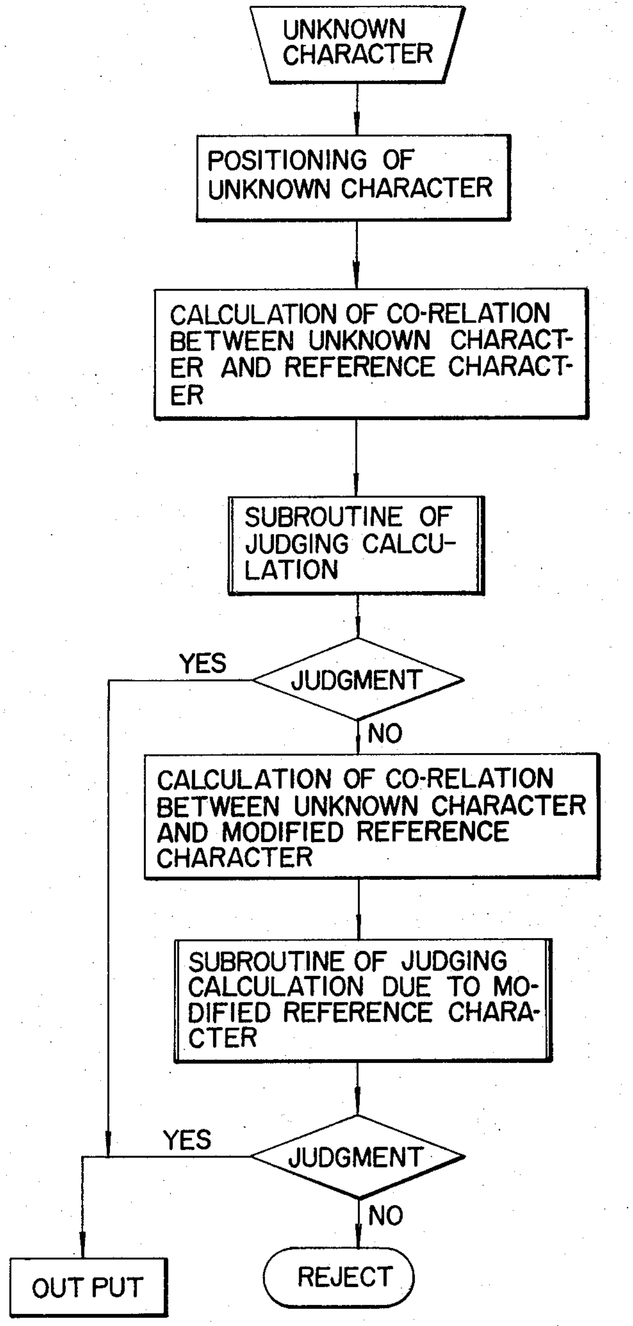

FIG. 10 is a flowchart showing a tournament sorting method based on pair judgement. The judgement computing subroutine 17 is as illustrated in FIGS. 9 A and 9 B.

Figure 11:
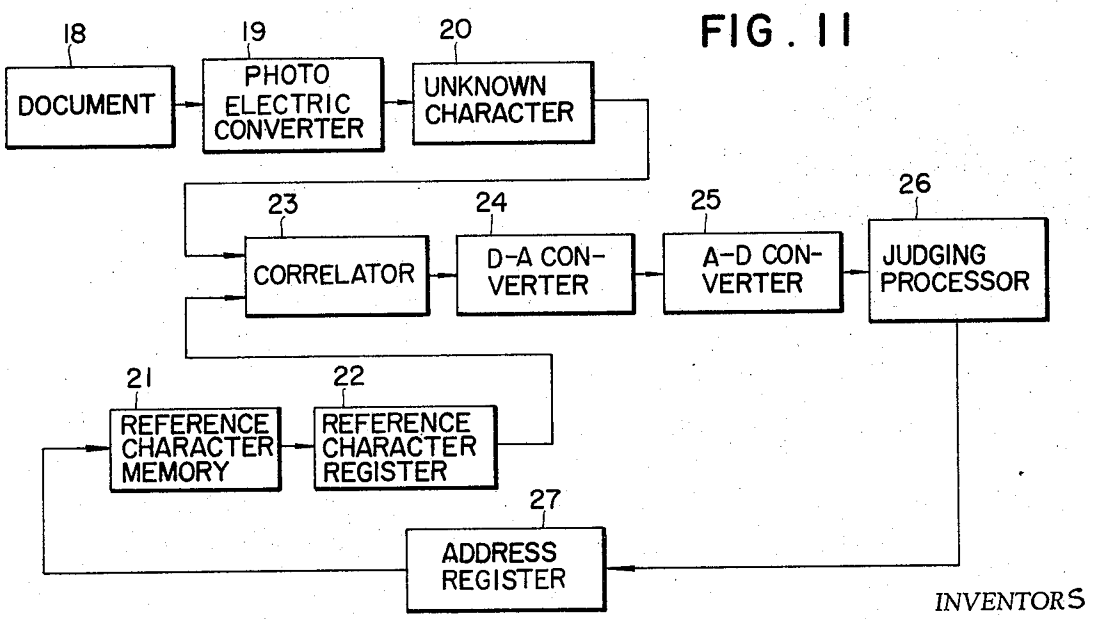

FIG. 11 is a block diagram showing a character reader employing the tournament sorting method of this invention. In FIG. 11, the numeral 18 denotes a document indicating an unknown character, 19 a photoelectric converter for converting the image of unknown character into an electrical signal, 20 a two-dimensionally arranged unknown character register, 21 a reference character memory, 22 a reference character register, 23 a correlator, 24 a D-A converter, 25 an A-D converter, 26 a judging processor, and 27 an X and Y address register. In this case, the judging processor 26 includes, for example, a typical digital computer or appratus having various known means for effecting various calculations defined by the equations, with which those skilled in the art are familiar. The reference character memory 21 may be such as internal memory using magnetic core, which is contained in the usual digital computer. However, in case the number of reference characters including modified reference characters is several tens to several hundreds, it is desirable to use a reference character memory of random access type (a semiconductor memory) or MOS IC memory (of dynamic shift register type) in order to speed up correlation computation. (Note: The commercially available MOS IC memory permits a readout in as fast a rate as 0.3 to 2 microseconds per character. Thus the memory contents corresponding to one reference character can be simultaneously read by one read command).

Figure 12:
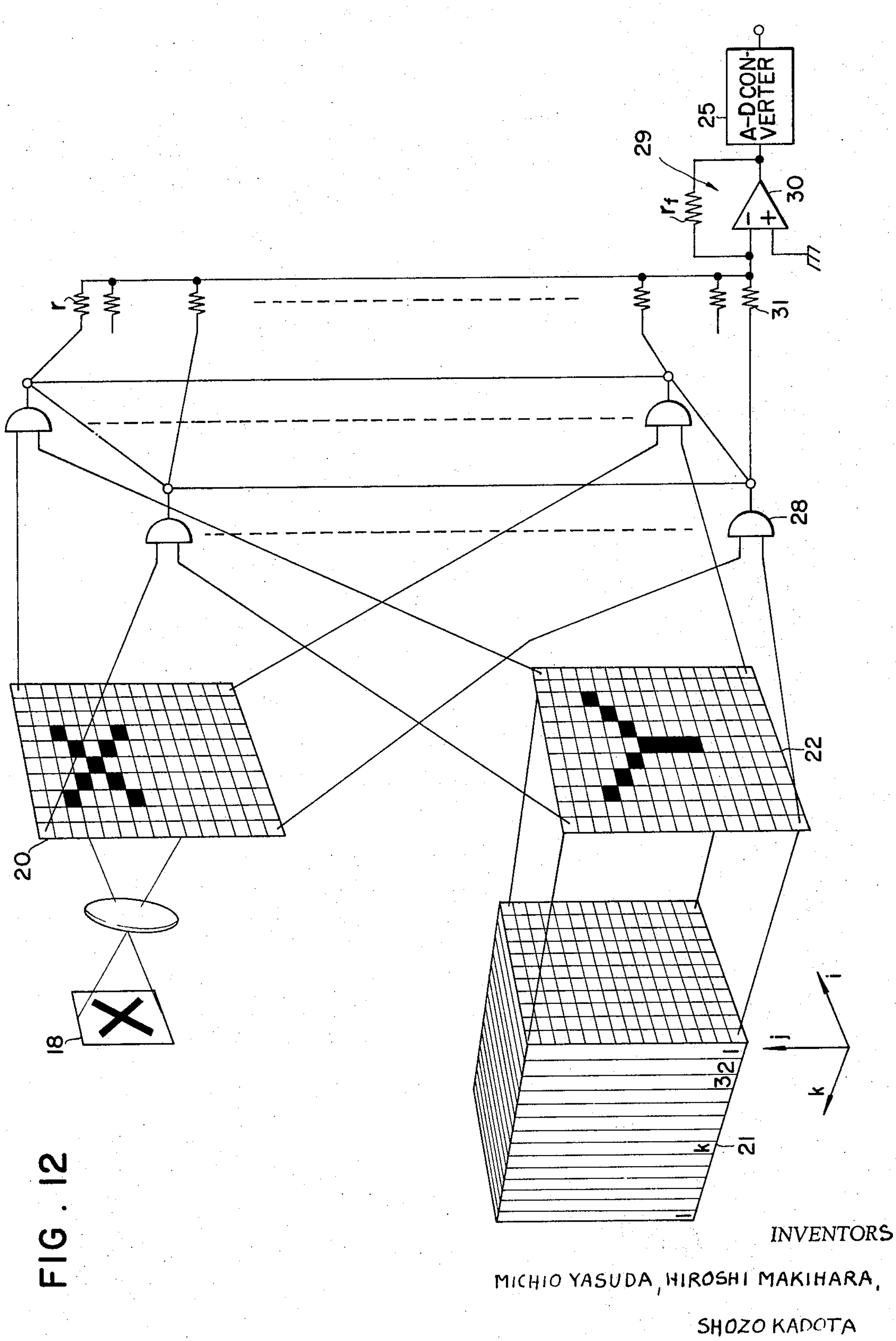

FIG. 12 shows an example of composition of correlator 23 and D-A converter 24. In FIG. 12, the numeral 28 denotes a plurality of AND circuits corresponding to said correlator 23. The outputs of the unknown character registers 20 and also the outputs of the reference character register 22 are connected to the inputs of said AND circuits. Thus, AND logic is applied between the unknown character and the reference character with respect to each corresponding bit. The numeral 29 denotes an adder corresponding to said D-A converter 24. This adder consists of a feedback resistor $r_f$ and an amplifier 30. A plurality of resistors 31 are connected to one terminal of the amplifier 30. The outputs of AND circuits 28 are applied to these resistors 31. The summed result of the logical outputs of AND circuits 28 is produced at the output terminal of the adder 29.

When a reference character selection command signal is supplied to the address register 27 from the judging processor 26, a specific reference character is read out in succession from the memory 21 into the registers 22. The output voltage of the adder 29 represents the correlation between the unknown character and the reference character. This output voltage is converted into a digital signal by the A-D converter 25 and then is supplied to the judging processor 26. The judging processor 26 executes the tournament sorting method by the foregoing pair judgement using said correlation and the weighting coefficient stored in the processor 26 whereby the unknown characters are sorted. As described before, the weighting coefficients $\omega^1 mn$ and $\omega^2 mn$ are derived from the correlation between the reference characters. Hence, by finding these coefficients through computation on the correlation between the reference characters each time it is desired, the weighting coefficients are not necessarily stored in the memory and, accordingly, the memory can be omitted. In this case, the computing time would become more than negligible. Whether to store the weighting coefficients previously or to find them by computation when required is to be determined according to which, cost or processing speed, an emphasis is placed on.

While the principles of the invention have been described above in connection with specific embodiments, and particular modifications thereof, it is to be clearly understood that this description is made only by way of example and not as a limitation on the scope of the invention.

We claim:

1. A character recognition system for effecting a pair judgement process comprising:

first means for converting the optical image of an unknown character into a first electrical signal formed of a plurality of bits;

second means, responsive to the plurality bits of the first electrical signal provided by said first means, for providing initial correlations between the bits of said first electrical signal representative of said unknown reference character and stored electrical representations of a plurality of reference characters, said second means including a first plurality of adder-amplifier circuits, having a plurality of inputs connected to the respective bit outputs of said first means, for adding the bits of said first signal to each other;

third means, responsive to the respective correlation outputs provided by said second means, for modifying said correlation outputs in accordance with prescribed correlation weighting coefficients, comprising a plurality of weighting coefficient resistors coupled to the outputs of said adder amplifier circuits of said second means, the values of said resistors corresponding to said predetermined correlation weighting coefficients; and fourth means, coupled to the outputs of said third means, for comparing said modified correlation outputs with a reference value and for judging into which one of a plurality of categories said unknown character belongs, including a plurality of comparator circuits receiving the respective outputs of said weighting coefficient resistors and comparing the outputs thereof with a reference voltage, and a plurality of "AND" circuits connected to respective pluralities of said compairators for producing signals corresponding to the category in which the unknown character belongs.

* * * * *